US010034422B2

(12) United States Patent
Palermo (10) Patent No.: US 10,034,422 B2
(45) Date of Patent: Jul. 31, 2018

(54) CUTTING HEAD FOR A STRING TRIMMER (71) Applicant: BLACK & DECKER INC., New Britain, CT (US)

(72) Inventor: John Palermo, Baltimore, MD (US)

(73) Assignee: BLACK & DECKER INC., New Britain, CT (US)

( * ) Notice: Subject to any disclaimer, the term of this patent is extended or adjusted under 35 U.S.C. 154(b) by 24 days.

(21) Appl. No.: 15/182,028

(22) Filed: Jun. 14, 2016

(65) Prior Publication Data
US 2017/0354090 A1 Dec. 14, 2017

(51) Int. Cl.
*B26B 7/00* (2006.01)
*A01D 34/416* (2006.01)

(52) U.S. Cl.
CPC ..... *A01D 34/4163* (2013.01); *A01D 34/4162* (2013.01); *A01D 34/4167* (2013.01)

(58) Field of Classification Search
CPC ............ A01D 34/4167; A01D 34/4163; A01D 34/416; A01D 34/4161; A01D 34/4162; A01D 69/02
USPC ......................................................... 30/276
See application file for complete search history.

(56) References Cited

U.S. PATENT DOCUMENTS

| 4,104,796 A | 8/1978 | Sheldon |
| 4,136,446 A * | 1/1979 | Tripp ................. A01D 34/4161 30/276 |
| 4,151,646 A | 5/1979 | Lane |
| 4,209,902 A | 7/1980 | Moore et al. |
| 4,245,454 A * | 1/1981 | Zien .................... A01D 34/4162 30/276 |
| 4,254,550 A | 3/1981 | Satoh |
| 4,347,666 A | 9/1982 | Moore |
| 4,426,780 A * | 1/1984 | Foster ................ A01D 34/4162 30/276 |
| 4,483,069 A | 11/1984 | Moore |
| 4,607,431 A | 8/1986 | Gay |
| 4,651,421 A | 3/1987 | Zerrer |
| 4,660,286 A | 4/1987 | Engelbrecht et al. |
| 4,817,288 A | 4/1989 | Hirose et al. |
| 4,835,867 A * | 6/1989 | Collins .............. A01D 34/4162 30/276 |
| 4,852,258 A | 8/1989 | Foster |
| 4,888,871 A | 12/1989 | Engelbrecht |

(Continued)

FOREIGN PATENT DOCUMENTS

| CN | 103828535 | 6/2014 |
| CN | 203934334 | 11/2014 |

(Continued)

OTHER PUBLICATIONS

EP Search Report for corresponding EP Application No. 17172880.1 dated Oct. 8, 2017.

*Primary Examiner* — Ghassem Alie
*Assistant Examiner* — Bharat C Patel
(74) *Attorney, Agent, or Firm* — John Yun (57) ABSTRACT

The present invention is directed to a string trimmer line feeding mechanism having a sliding lever that locks a spool relative to the spool housing, and only feeds additional cutting line when the user actuates a button. This brakes a motor, which generates a force acting on the spool to move the lever into an unlocked position, allowing the spool to rotate relative to the spool housing and feed additional cutting line.

17 Claims, 12 Drawing Sheets

(56) References Cited

U.S. PATENT DOCUMENTS

| | | | |
|---|---|---|---|
| 4,926,557 A | 5/1990 | Haupt | |
| 5,020,224 A | 6/1991 | Haupt | |
| 5,063,673 A | 11/1991 | Webster | |
| 5,222,301 A | 6/1993 | Sugihara et al. | |
| 5,276,968 A * | 1/1994 | Collins | A01D 34/4162 30/276 |
| 5,293,692 A | 3/1994 | Sugihara et al. | |
| 5,295,306 A | 3/1994 | Sugihara et al. | |
| 5,311,665 A | 5/1994 | Sugihara et al. | |
| 5,461,787 A * | 10/1995 | Araki | A01D 34/4162 30/276 |
| 5,522,140 A | 6/1996 | Sugihara et al. | |
| 5,522,141 A | 6/1996 | Sugihara et al. | |
| 5,526,572 A | 6/1996 | Sugihara et al. | |
| 5,855,068 A | 1/1999 | Zilly et al. | |
| 6,594,907 B2 | 7/2003 | Wilson et al. | |
| 6,952,877 B2 | 10/2005 | Pfaltzgraff | |
| 7,624,559 B2 * | 12/2009 | Hishida | A01D 34/902 30/276 |
| 2012/0066913 A1 | 3/2012 | Alliss et al. | |
| 2016/0143218 A1 * | 5/2016 | Sergyeyenko | A01D 34/4163 30/276 |
| 2016/0249529 A1 * | 9/2016 | Ma | A01D 34/4161 30/276 |

FOREIGN PATENT DOCUMENTS

| | | | |
|---|---|---|---|
| CN | 104170579 | 12/2014 | |
| CN | 204069756 | 1/2015 | |
| CN | 104620756 | 5/2015 | |
| EP | 0838144 | 4/1998 | |
| WO | WO2017059917 | 4/2017 | |
| WO | WO 2017059917 A1 * | 4/2017 | A01D 34/4162 |

* cited by examiner

CUTTING HEAD FOR A STRING TRIMMER

FIELD OF THE INVENTION

The present invention discloses a string having a cutting head with an improved line feed mechanism.

BACKGROUND OF THE INVENTION

Existing string trimmers use a flexible line spinning at high speeds to cut vegetation. The line is often made of a plastic or similar material that is gradually worn down during use. As the line shortens, additional line is released from a spool to maintain a minimal line length for proper operation.

Existing line feed mechanisms for string trimmers fall into two general categories; bump feed and automatic line feed systems. Bump feed systems require the user to bump the working head on the ground, which causes the spool to be release from a locked position so that additional line is fed. The problem with this method is that it requires the user to regularly bang the spool housing on the ground, which wears out the spool housing. Furthermore, accidental line feeding occurs when the user inadvertently bangs the string trimmer on the ground, thus feeding out line when not needed and leading to waste.

Automatic feed systems use a pivoting arm or something similar to balance forces within the spool to feed out line when the forces become unbalanced. The cutting line extends from the spinning spool and generates a force that, over time, decreases as the line is worn down. When the line is shortened past a minimum length, the force generated by the line is below a threshold so that the pivoting arm is released, allowing the spool to feed out additional line. The problem with these automatic feed systems is they are very delicate and establishing the proper balance of forces within the spool is difficult. Oftentimes, cutting line is fed out when not needed. For example, a user will often operate the string trimmer close to a fence or wall, and this wears down cutting line very quickly. Because additional line is being automatically fed, the user is unaware that the line is being worn down so quickly, which this leads to wasted line and empty spools. Conversely, when additional line is needed, oftentimes cutting line is not properly fed out. This leads to a very frustrating user experience.

BRIEF SUMMARY OF THE INVENTION

It is therefore an object of the present invention to provide a string trimmer with a line feed mechanism that does not require the user to bang the spool housing on the ground and offers a more reliable system.

Accordingly, the present invention is directed to a string trimmer having a user actuated button that feeds out line only when needed. The user actuated button activates a motor braking mechanism that rapidly halts rotation of the motor, which in turn generates a large force within the spool assembly to initiate the line feed. A lever within the spool assembly locks the spool relative to a spool housing. In normal operation, this lever remains locked and absorbs the forces normally associated with typical use. However, the large force generated by braking the motor unlocks the lever, allowing cutting line to be fed out. In this way, only when the user desires more line and actuates the button, is additional cutting line fed out.

BRIEF DESCRIPTION OF THE INVENTION

Further features and advantages of the present invention will be better understood by reference to the following description, which is given by way of example and in association with the accompanying drawings, in which.

DETAILED DESCRIPTION OF THE INVENTION

Figure 1:
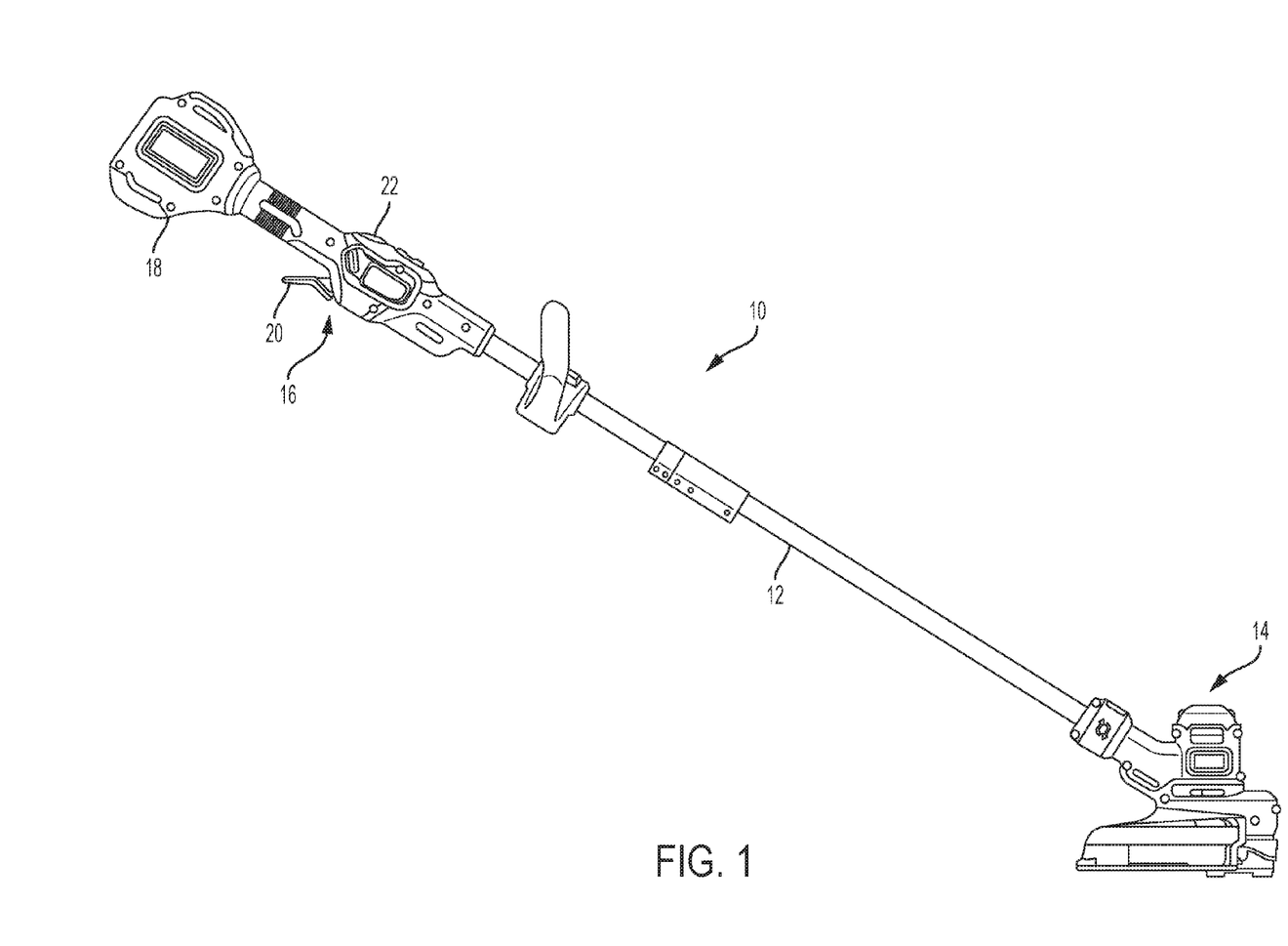
FIG. 1 is a string trimmer in accordance with an embodiment of this invention.

FIG. 1 shows a string trimmer 10 in accordance with an embodiment of the invention. The string trimmer includes a shaft 12 having a working head 14 on a first forward end, and a handle 16 on a second rearward end. To the rear of the handle 16 is a battery housing 18 for holding a battery to power a motor. It should be understood that AC power may be used as well and still fall within the scope of the invention. The handle 16 includes a trigger 20 to actuate the motor and a button 22 to initiate the line feed, as will be further explained later.

Figure 2:
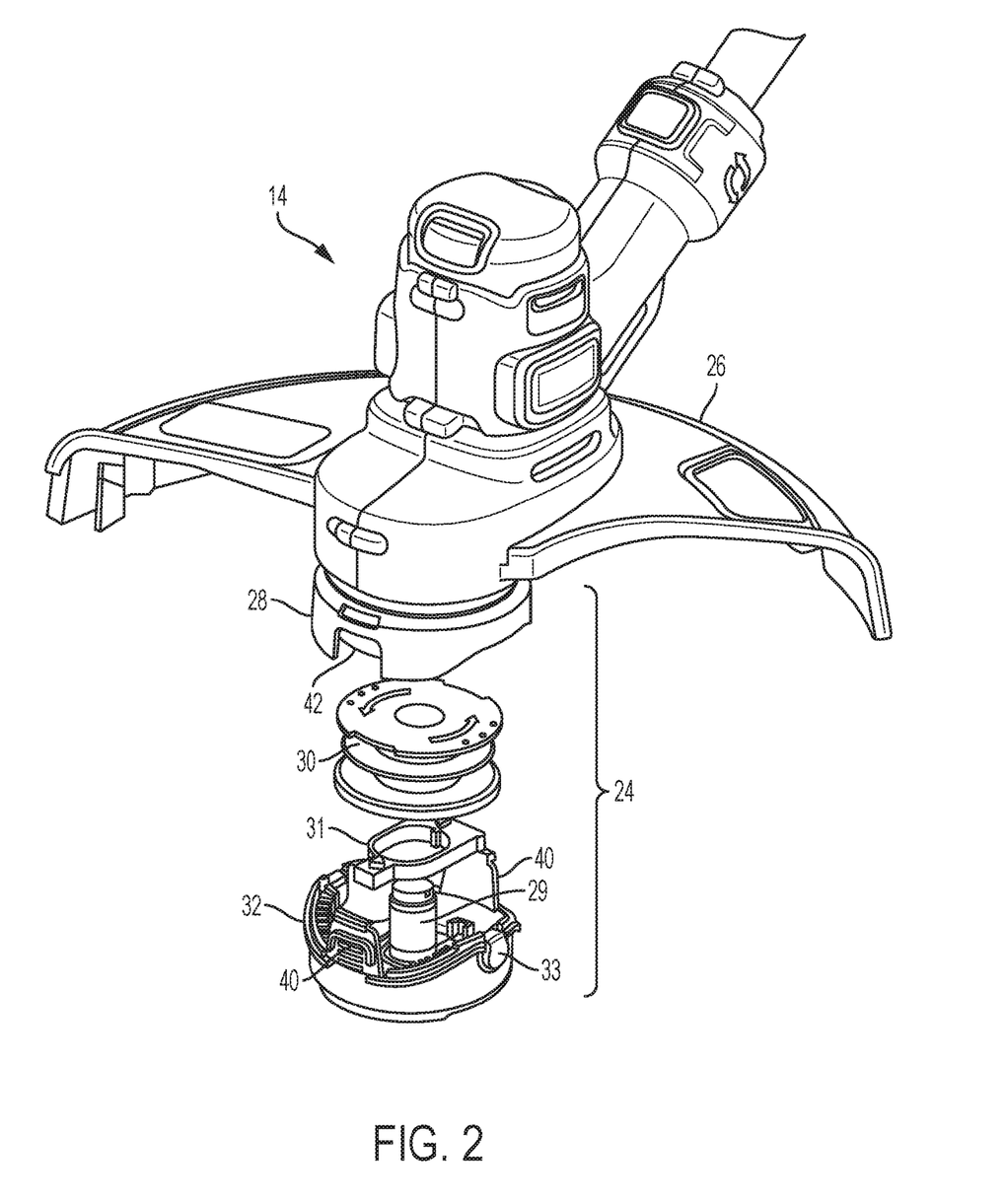
FIG. 2 is an exploded view of the working head of the string trimmer of FIG. 1.
Figure 3:
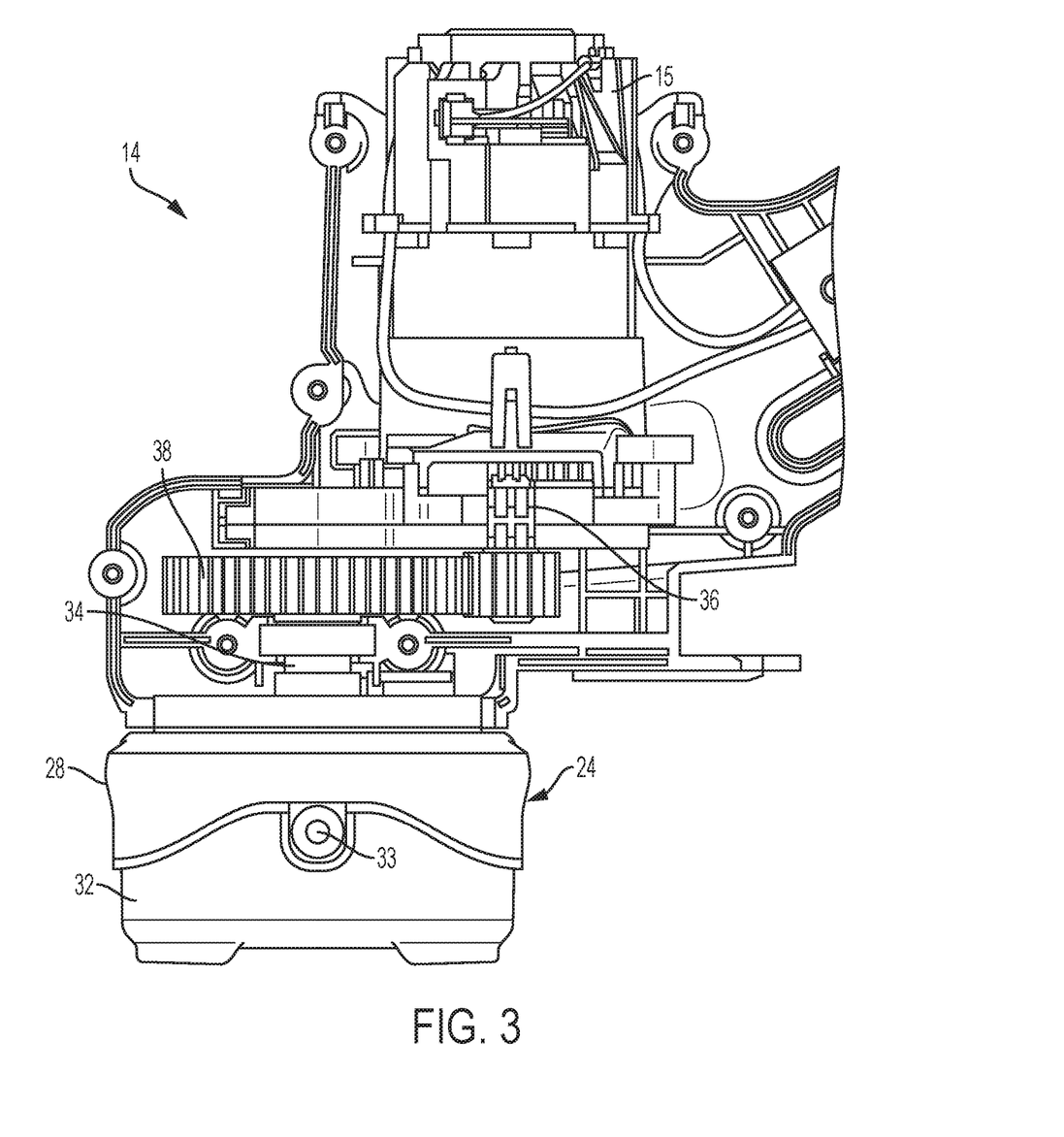
FIG. 3 is a side cut-away view of the working head.

Now referring to FIGS. 2 and 3, the working head 14 houses the motor 15, and includes a spool assembly 24 and a guard 26 to shield the user from flying debris. The spool assembly 24 includes a spool housing 28, a spool 30 housed in the spool housing, and a spool cap 32. Also included is a lever 31 that locks and releases the spool 30 relative to the spool cap 32 to feed out cutting line. The spool cap 32 includes tabs 40 that engage with corresponding apertures 42 in the spool housing 28 to lock the cap 32 to the housing 28. The spool housing 28 is fixedly connected to a drive shaft 34 that is operationally connected to the output shaft 38 of the motor 15 through gears 38. Therefore, the spool housing 28 rotates with the motor 15. The cap 32 also includes an axle 29 around which the spool 30 rotates, and openings 33 allowing for spool line to be fed out of the spool assembly 24.

Figure 4:
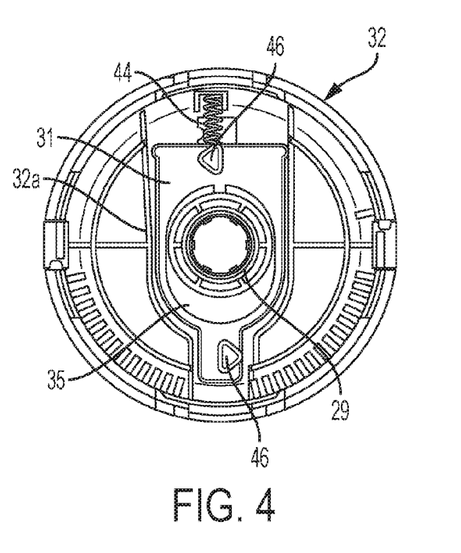
FIG. 4 is top view of the spool assembly showing a retracted position.
Figure 5:
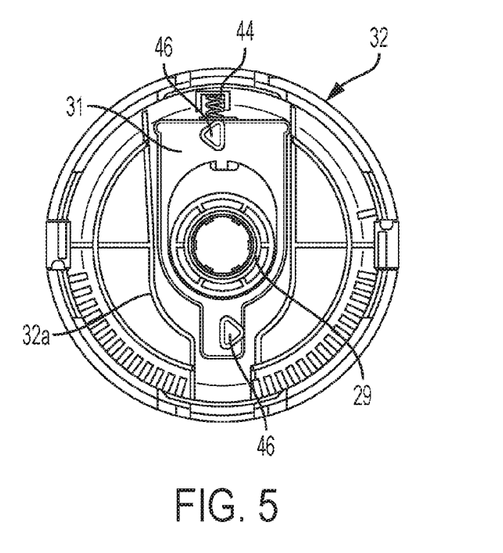
FIG. 5 is a top view of the spool assembly showing an extended position.
Figure 6:
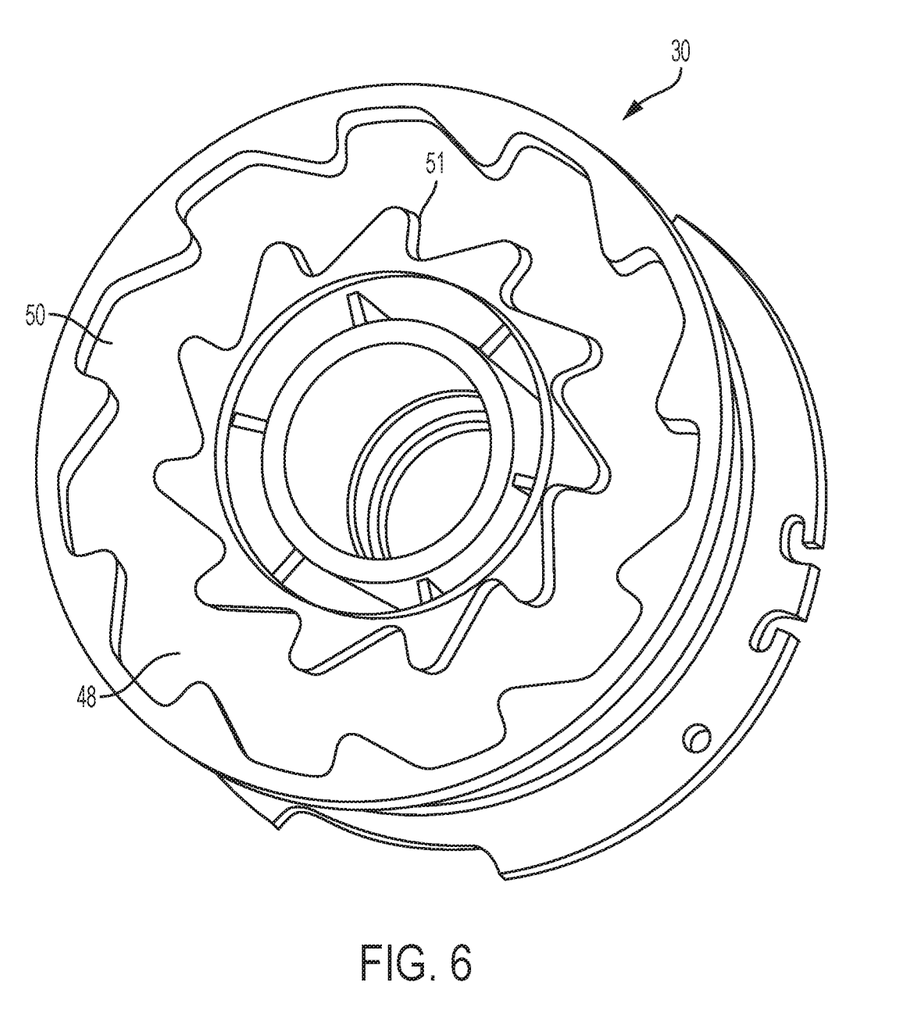
FIG. 6 is an perspective view of the bottom of a spool.

Now referring to FIGS. 4 and 5, the drawings show a top view of the cap 32 and the lever 31. The lever 31 includes a large oval shaped opening 35 to accommodate the axle 29, and is sized to allow the lever 31 to slide from a retracted position (shown in FIG. 4) to an extended position (shown in FIG. 5). A spring 44 is set against the cap 32 and urges the lever 31 into the retracted position, and when the lever 31 in the extended position, the spring is compressed. The lever 31 has two triangular shaped posts 46 at opposite ends that engage troughs 50, 51 formed within a track 48 in the bottom of the spool 30 (see FIG. 6). The troughs 50, 51 retain the posts 46 and keep the spool 30 from rotating relative to the cap 32.

Figure 7:
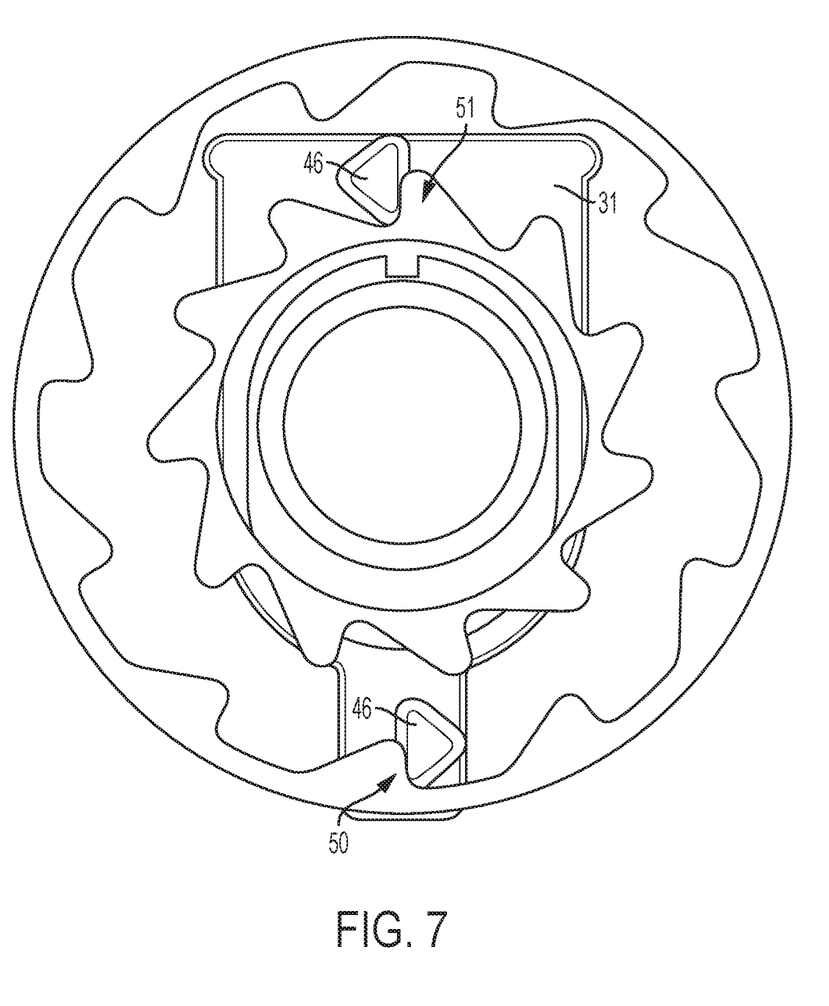
FIG. 7 is a cut-away view of the spool and lever in the retracted position.
Figure 8:
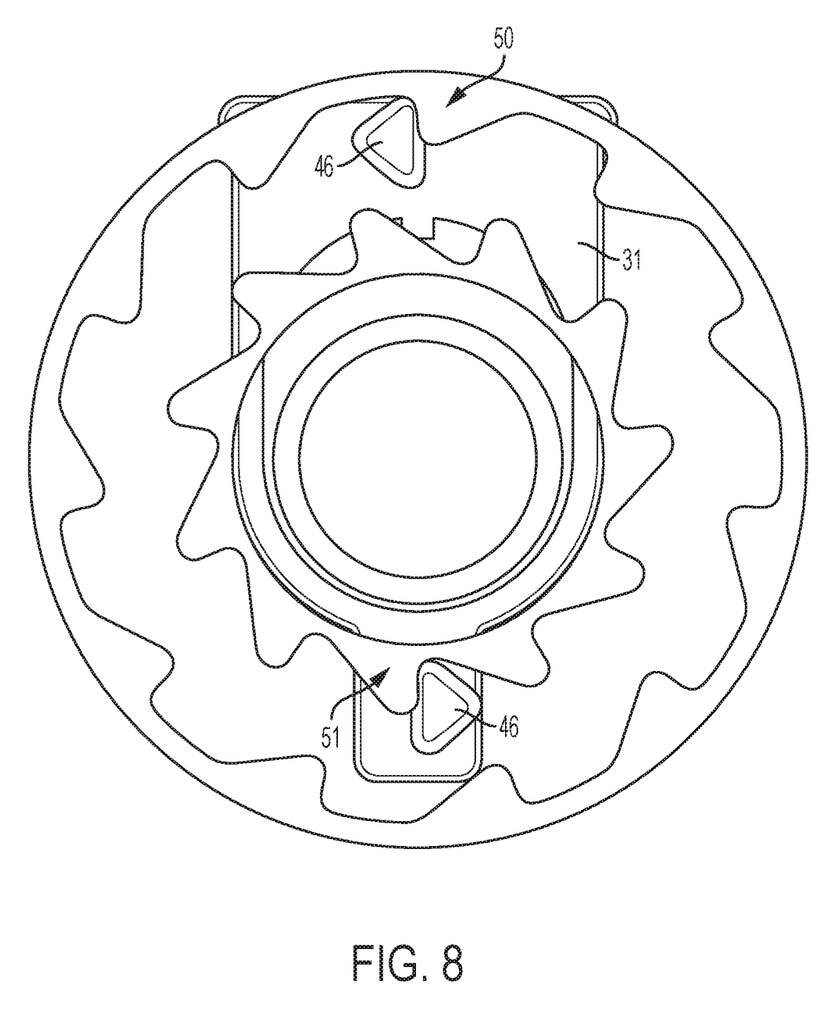
FIG. 8 is a cut-away view of the spool and lever in the extended position.
Figure 9:
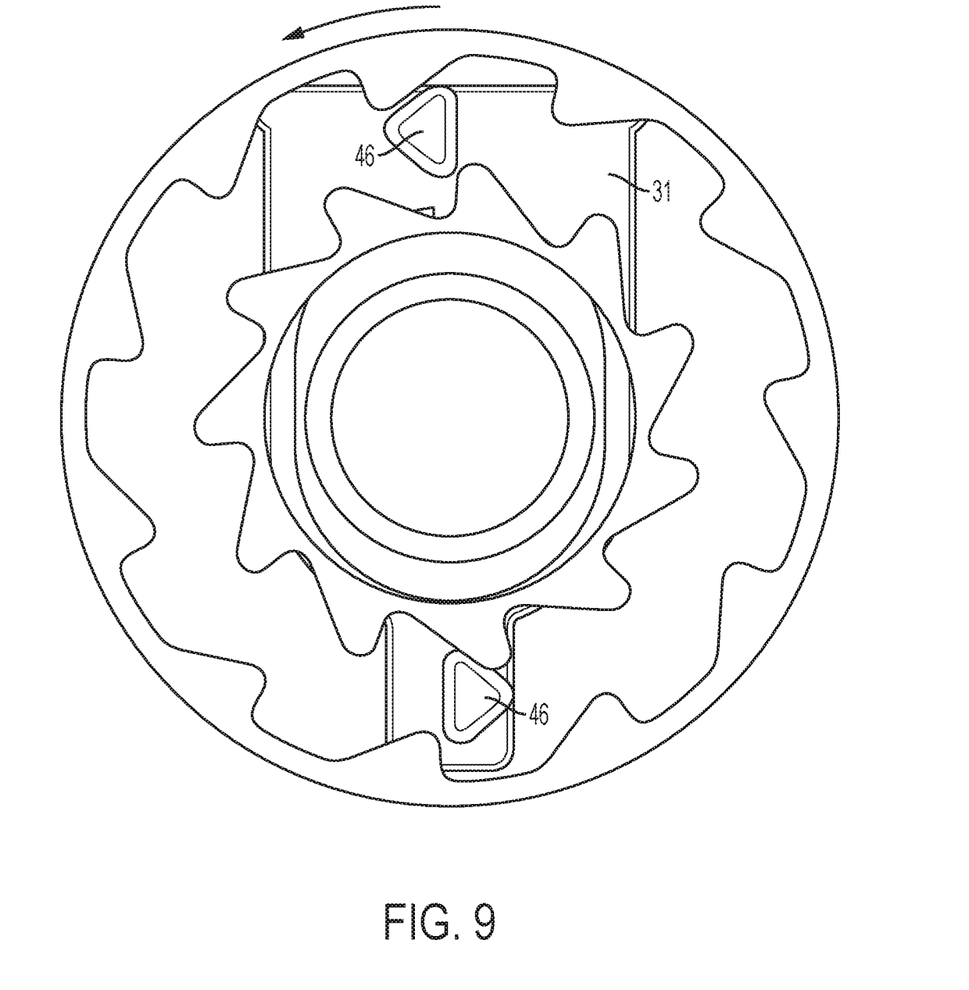
FIG. 9 is a cut-away view of the spool and lever in a transitional position.

FIG. 7 shows the position of the posts 46 when the lever 31 is in the retracted position within the troughs 50, 51. One of the posts 46 (in this case, the one at the top) is engaged with the inner trough 51, while the other post (the one at the bottom) is engaged with the outer trough 50. This prevents the spool from rotating in the counterclockwise direction, and feeding additional line out of the spool assembly. FIG. 8 shows the lever 31 in the extended position. Here, the posts 46 are in the opposite troughs so that the top post engages the outer trough 50 and the bottom post engages the inner trough 51. Again the spool is locked and prevented from rotating to feed more line. Referring now to FIG. 9, the lever 31 is shown in the transition position between the retracted and extended position. It is in this position that the posts 46 are freed from both troughs 50, 51 and the spool 30 is free to rotate.

The movement of the lever 31 between its retracted and extended position occurs when the motor is started and stopped. When the motor is stopped, and no forces are acting on the lever 31, and the spring 44 forces the lever 31 into its retracted position. When the motor is started, centrifugal forces act on the lever 31 to force it outwardly, against the spring force, into the extended position. It stays in this position until the motor is again stopped, removing the centrifugal forces so that the lever 31 returns to its retracted position. In this way, line is fed out every time the motor is started or stopped and the lever transitions between its retracted and extended position, as is known in the prior art. However, this design produces a lot of wasted cutting line since users don't need additional cutting line every time the motor is turned on or off.

Figure 10:
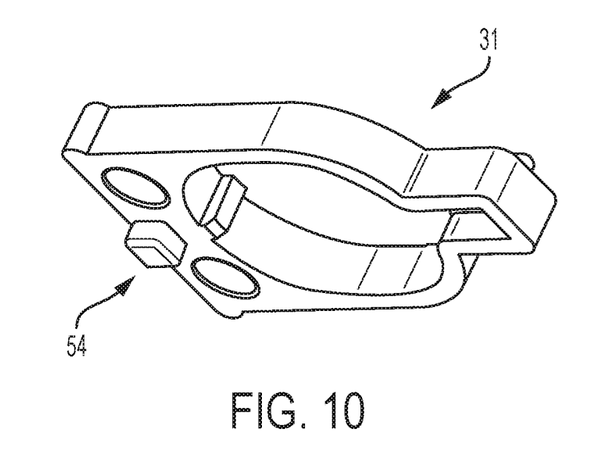
FIG. 10 is a bottom view of the lever.
Figure 11:
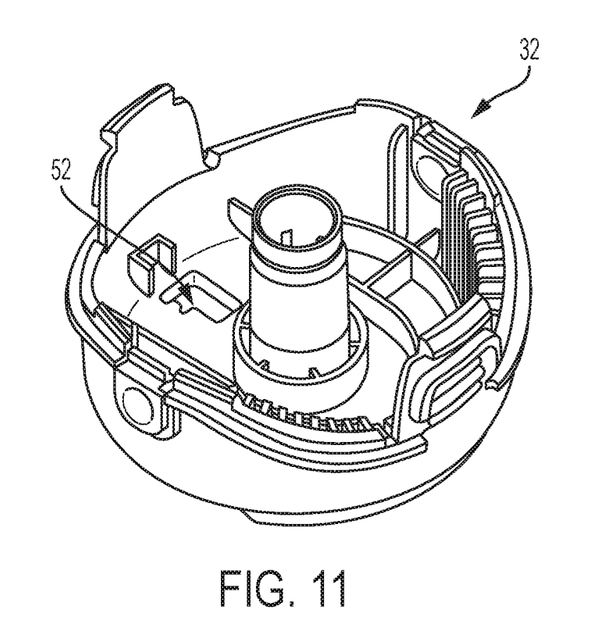
FIG. 11 is a top view of the spool cap.

The present invention overcomes this deficiency by feeding additional cutting line only when the user actually needs more cutting line. This is done by providing an L-shaped slot 52 in the spool cap 32, which cooperates with a peg 54 on the bottom of the lever 31 (see FIGS. 10 and 11). The slot 52 retains the lever 31 in the extended position so that it does not feed line every time the motor is started or stopped.

Figure 12:
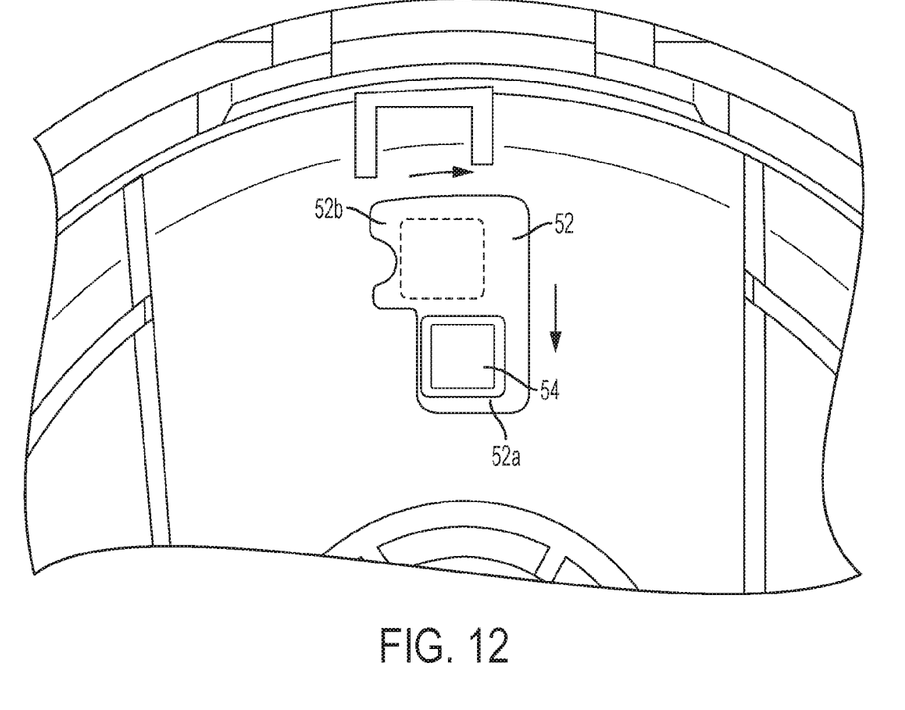
FIG. 12 shows the lever peg interacting with the spool cap.

To illustrate, see FIG. 12. When the motor is stopped, the peg 54 resides at the base 52*a* of the slot 52. When the motor is actuated, the spool assembly rotates in the clockwise direction (see arrow), and the lever 31 moves into the extended position due to centrifugal forces, as described previously. The peg 54 moves up from the base 52*a*, and because of the rotational forces acting on the lever 31, moves into the arm 52*b* of the slot 52. When the motor is de-energized and allowed to gradually reduce speed, the peg 54 engages the arm 52*b* and prevents the lever 31 from returning to its retracted position. Therefore no additional cutting line is fed out when the motor is stopped. When the motor is started again, the peg 54 is already in the extended position and locked, so no line is fed out.

Referring back to FIGS. 4 and 5, the spool cap 32 includes internal walls 32*a* on both sides of the lever 31. The walls 32*a* form a channel within which the lever 31 can slide up and down. Additionally, a small clearance is provided between the walls 32*a* and the lever 31 so that the lever 31 can rotate about axle 29 into and out of the arm 52*b*.

To unlock the peg 54, the button 22 on the string trimmer is actuated. This brakes the motor 15, and the sudden stopping of the spool assembly from spinning causes the peg 54 to move to the right and be released from the arm 52*b*. The lever 31 can then move back into the retracted position, and consequently, feed additional cutting line. It should be appreciated that this result can be achieved any number of ways, so long as the rotation of the spool assembly is abruptly stopped (as opposed to the gradual slowdown of the spool assembly when the user simply releases the power trigger). For example, the motor can be braked or shorted electronically or a mechanical brake can be applied to the spool assembly to effectuate the sudden stop. An example of an electronic braking system is disclosed in U.S. Ser. No. 14/552,682, hereby incorporated by reference.

Also, the dimensions of the arm 52*b* are important as it needs to be deep enough to ensure that the peg 54 remains in the locked position during normal operation and withstand the typical forces that may act on the spool assembly, such as the cutting line striking objects while in use. Conversely, the arm 52*b* cannot be too deep that the peg 54 cannot be released when the button 22 is actuated and the motor braked. As can be seen in FIG. 12, the depth of the arm 52*b* is about ⅛ of the width of the peg 54, and in a preferred embodiment is in the range 1/10 to ½ of the peg width.

Figure 13A:
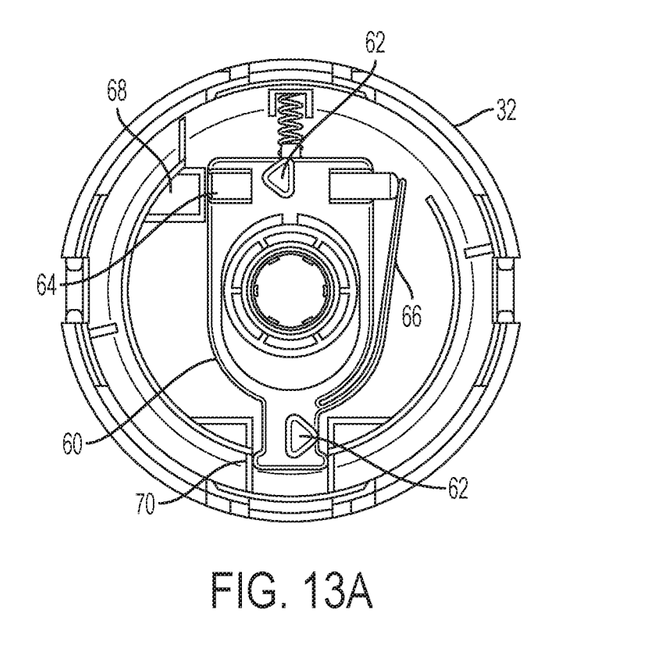
FIGS. 13A and 13B shows a lever and spool cap according to a second embodiment of the invention.
Figure 13B:
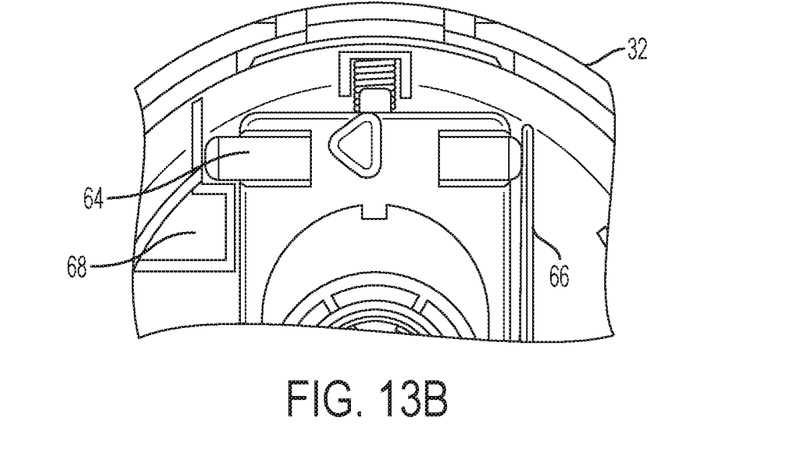

FIGS. 13A and 13B show an alternate embodiment of the invention. Here, a lever 60 includes posts 62, which engage the troughs 50, 51 in the spool 30 similar to that described in the previous embodiment. A sliding pin 64 is provided at an outer end of the lever 60, with a resiliently biased arm 66 that urges the pin 64 to the left. When the lever 60 is in the retracted position (shown in FIG. 13A), the pin 64 abuts a retainer 68. When the lever 60 is in the extended position (shown in FIG. 13B), the pin 64 move past the retainer 68 and the arm 66 urges the pin 64 to the left where it engages the retainer 68 and prevents the lever 60 from retracting. Similar to the previous embodiment, the lever 60 will remain in this locked position until a sudden stop urges the pin 64 to the right against the biasing force of the arm 66, and releases it from the retainer 68, allowing the lever 60 to move back to its retracted position. Unlike the previous embodiment, the lever 60 does not rotate about the axle 29, and so the spool cap includes walls 70 that contact the lever 60, allowing only linear movement (eg. sliding up or down in FIG. 13A).

Figure 14A:
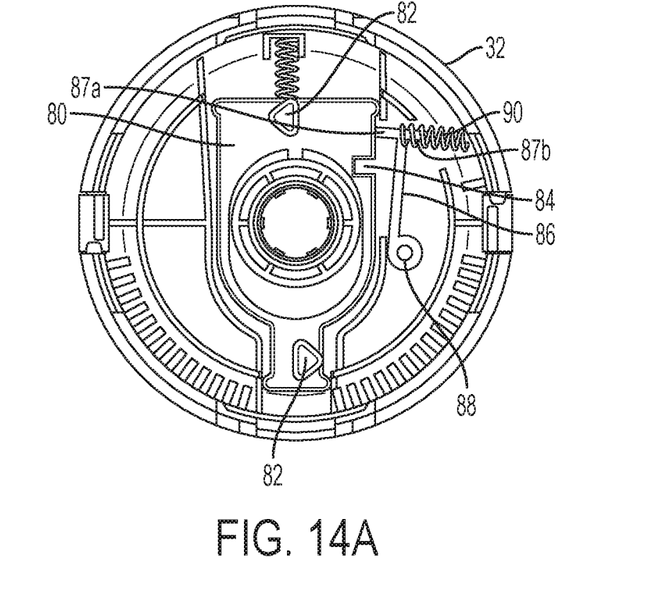
FIG. 14A and 14B shows the lever and spool cap according to a third embodiment of the invention.
Figure 14B:
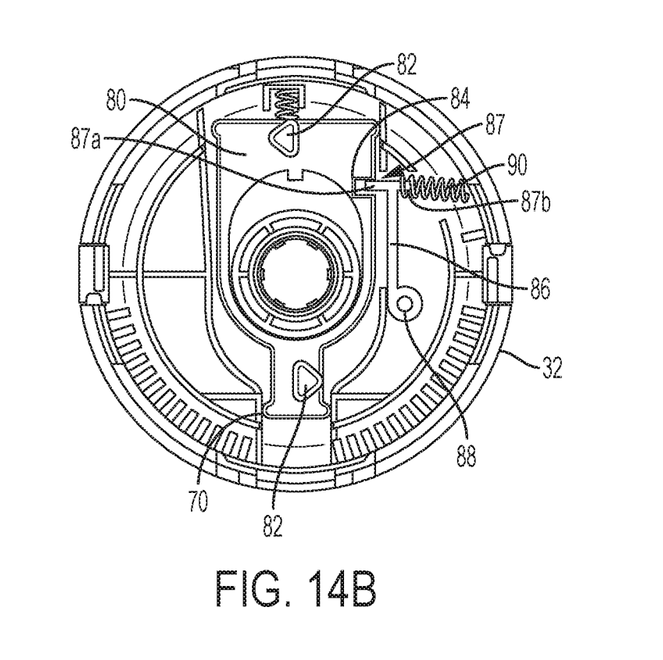

FIGS. 14A and 14B show yet another embodiment of the invention. Here, the lever 80 again includes posts 82 that engage with troughs 50, 51 in the spool 30 to lock the spool 30 from feeding cutting line. The lever 80 includes a cut-out 84 that engages a locking arm 86 that pivots about a pivot point 88. The locking arm 86 includes a head 87 with a first portion 87*a* that engages the cut-out 84, and a second portion 87*b* that holds a spring 90. The spring 90 urges the arm 86 to the left. When the lever 80 is in the retracted position (see FIG. 14A), the first portion 87*a* of the head contacts an outer surface of the lever 80. When the lever 80 moves to the extended position (see FIG. 14B), the first portion 87*a* of the head enters the cut-out 84 to lock the lever 80 in the extended position. The lever 80 stays in this locked position until a sudden stop urges the arm 86 to the right against the biasing force of the spring 90, unlocking the lever 80 and allowing it to return to its retracted position. Like the embodiment shown in FIGS. 13A and 13B, the spool cap includes walls 70 that allow the lever 80 to slide up and down, and prevent rotation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method of releasing cutting line from a string trimmer comprising the steps:
   providing a string trimmer having a working head including a spool assembly and a motor operatively connected to the spool assembly to rotate the spool assembly, the spool assembly having a spool housing and a spool cap that are coupled together to define an interior space, a spool having cutting line thereon and a lever housed in said interior space;
   wherein the lever slides transversely between a retracted and an extended position, and in both positions, locking the spool to prevent rotation;
   wherein when the motor is not energized, a spring biases the lever in one of the retracted or the extended position;
   energizing the motor to rotate the spool assembly and move the lever into the other of the retracted or extended position, the lever having a peg that engages a slot in one of the spool cap or spool housing to lock the lever in the retracted or extended position, wherein the transition of the lever between the lever's retracted and extended positions unlocks the spool allowing the spool to rotate and feed out cutting line.

2. The method of releasing cutting line from a string trimmer according to claim 1, further comprising the step:
   de-energizing the motor and allowing the spool assembly to gradually reduce its rotational speed at a first speed reduction rate, wherein at the first speed reduction rate the slot retains the peg and keeps the lever in the locked position so that the spool is prevented from rotating and feeding cutting line.

3. The method of releasing cutting line from a string trimmer according to claim 2, further comprising the step:
   actuating a button on the string trimmer that forceably brakes the motor to reduce the motor's rotational speed at a second speed reduction rate, which is faster than the first speed reduction rate, the braking of the motor freeing the peg from the slot so that the lever moves from one of the retracted or the extended position to the other of the retracted or the extended position, and allowing the spool to rotate and feed cutting line.

4. A string trimmer tool comprising:
   a shaft having a handle on one end thereof and a working head on an opposite end;
   the working head including a spool assembly having a spool housing, a spool, a spool cap and a lever;
   a motor operatively connected to rotate the spool assembly;
   the spool housing and spool cap being coupled together to define an interior space and housing a spool with cutting line wound thereon;
   the lever being movable between a retracted position and an extended position, and in both positions the lever rotationally locks the spool relative to the spool housing or spool cap, and during the transition of the lever between these two positions the spool is in an unlocked state so that the spool is free to rotate and feed out additional cutting line;
   wherein the lever slides transversely, and includes a peg to lock the lever in one of the retracted or the extended position; a spring to urge the lever to one of the retracted or the extended position; and wherein one of the spool housing or spool cap includes a slot for engaging the peg to lock the lever in one of the extended or the retracted position.

5. The string trimmer tool according to claim 4, wherein the lever moves into the other extended or the retracted position from spring urged position when the spool assembly is rotating, and the lever is locked in the other extended or retracted position by the slot.

6. The string trimmer tool according to claim 5, wherein the slot is L-shaped and rotation of the spool assembly moves the peg into an arm of the slot to lock the lever in the extended or the retracted position.

7. The string trimmer tool according to claim 6, wherein the arm of the slot has a depth less than the width of the peg, to prevent the entirety of the peg from residing in the arm when locked.

8. The string trimmer tool according to claim 4, wherein the spool includes a track having troughs, and the lever includes posts that move within the track and engage the troughs when the lever is in both the extended and retracted position to lock the spool.

9. The string trimmer tool according to claim 4, wherein the lever includes an opening to accommodate an axle of the spool cap or spool housing.

10. The string trimmer tool according to claim 4, wherein one of the spool cap or spool housing includes interior walls to guide the transverse movement of the lever.

11. The string trimmer tool according to claim 9, wherein clearance space is provided between the interior walls and the lever so that the lever can rotate.

12. A string trimmer tool comprising:
   a shaft having a handle on one end thereof and a working head on an opposite end;
   the working head including a spool assembly having a spool housing, a spool, a spool cap and a lever;
   a motor operatively connected to rotate the spool assembly;
   the spool housing and spool cap being coupled together to define an interior space, the spool and lever being housed in said interior space, the spool having cutting line wound thereon;
   wherein the lever slides transversely within the interior space between a retracted position and an extended position, and in both positions the lever locks the spool from rotating, and during the transition of the lever between the retracted and extended position the lever is in an unlocked state so that the spool is free to rotate to feed out additional cutting line;
   wherein the lever includes a peg, and one of the spool housing or spool cap includes a slot for engaging the peg to lock the lever in one of the extended or retracted position.

13. The string trimmer tool according to claim 12, further including a spring for biasing the lever into the retracted position, wherein the lever moves into the extended position when the spool assembly is rotating, and the lever is locked in the extended position by the slot.

14. The string trimmer tool according to claim 13, wherein the slot is L-shaped and rotational forces move the peg into an arm of the slot to lock the lever in the extended position, and wherein the arm of the slot has a depth less than the width of the peg, to prevent the entirety of the peg from residing in the arm when locked.

15. The string trimmer tool according to claim 14, wherein one of the spool cap or spool housing includes interior walls confining the lever, the walls being spaced from the lever to allow the lever peg to rotate into the slot.

16. The string trimmer tool according to claim 14, wherein the spool includes a track having a series of inner troughs and outer troughs, and the lever includes at least one post that rides within the track and engages the inner and outer troughs to prevent the spool from rotating.

17. The string trimmer tool according to claim 12, wherein the lever includes an opening to accommodate an axle of the spool cap or spool housing.

\* \* \* \* \*